Feb. 6, 1968          A. WEILAND                3,367,091
                      LAWN CARE UNIT
Filed March 24, 1965                         2 Sheets-Sheet 1

INVENTOR.
ALFRED WEILAND
BY Leon Edelson
ATTORNEY

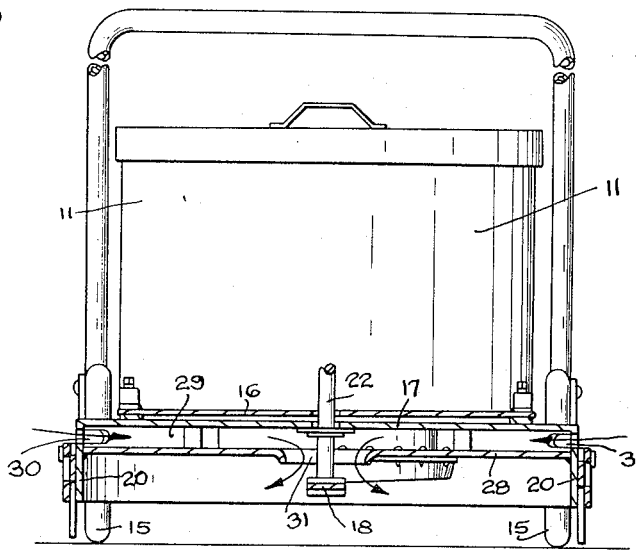
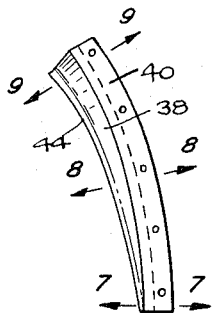
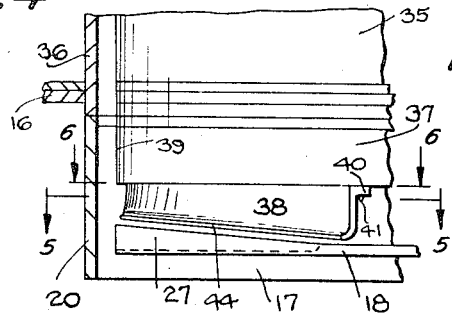
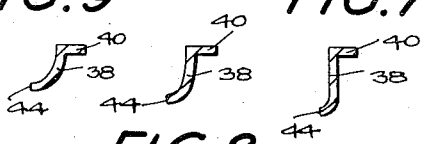
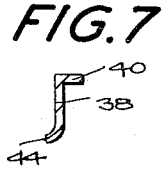
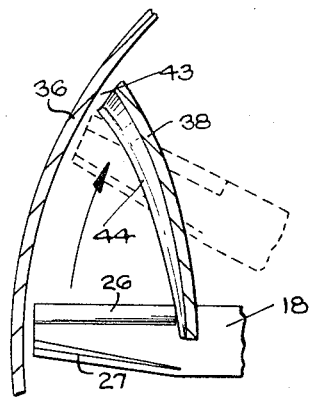
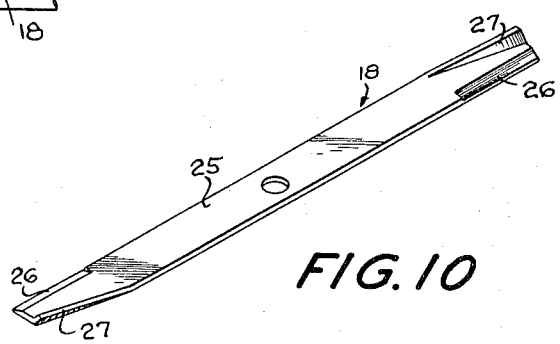

United States Patent Office 3,367,091
Patented Feb. 6, 1968

3,367,091
LAWN CARE UNIT
Alfred Weiland, 200 Haven St.,
Clearwater, Fla. 33516
Filed Mar. 24, 1965, Ser. No. 442,360
8 Claims. (Cl. 56—25.4)

ABSTRACT OF THE DISCLOSURE

A lawn care unit having a power-driven cutting blade rotatable in a horizontal plane within a housing open toward the ground. The cutting blade is provided at each of its opposite ends with a grass cutting edge and with an upwardly inclined air impeller vane in trailing relation to the cutting edge. The air impeller vanes, upon rotation of the cutting blade, creates a pressurized air stream about the interior of the blade housing by means of which the grass cuttings are forced into a collector by way of an outlet leading from the interior of the blade housing to the collector. The outlet is provided at its entrance end with a shear plate so designed and disposed in relation to the impeller vanes as to shred the grass cuttings which are impelled by the impeller vanes against the shear plate, which shearing action is auxiliary to the cutting action of the blade cutting edges in that it not only shreds the grass cuttings into small particle size but also breaks up any clogs of packed wet grass which might otherwise be too heavy to be forced by the pressurized air stream toward and into the collector.

DESCRIPTION

This invention relates generally to lawn care units and more particualrly to certain improvements in the design and construction of a lawn mower of the rotary blade type, having provision for collecting the grass cuttings and debris obtained during the operation of mowing the lawn and winnowing therefrom the lighter weight debrisfree cuttings for discharge to and distribution over the lawn in the wake of the mower.

Among the principal objects of the present invention is the provision in a lawn care unit of the character above described of improved means for effectively creating a maximum flow of air in the region of the rotary cutting blade upon rotation thereof for forced circulation of the air as the medium for conveying the grass cuttings and debris to a collector wherein the heavier particles are deposited for subsequent disposal while the lighter particles are winnowed out for air-borne discharge over the ground traversed by the lawn care unit.

A further object of the invention is to provide in a lawn care unit of the character aforesaid a self-cleaning chute or passage through which air-borne grass cuttings and debris may be delivered from the rotating cutting blade region of the unit to a receiver for collecting and separating the cuttings.

Another object of the invention is to provide improved means for creating a positive flow of pressurized air generated by the centrifugal force of air impelling vanes on the rotating cutter bar of a rotary power lawn mower and directing it upwardly through a discharge passage leading to a collector for the grass cuttings and debris, the inlet to the chute being so juxtaposed and formed relatively to the cutter bar air impelling vanes as to operate conjointly therewith to shred and break up the cuttings sufficiently to reduce their tendency to clog up said discharge passage, and thereby insure most efficient utilization of the air stream as the medium for conveying the cuttings to the collector.

Still another object of the invention is to provide a lawn care unit of the character described having means for allowing wet grass and other objects which do not immediately enter the discharge passage leading to the collector to move past the inlet to said passage for subsequent delivery thereto by the continuously rotating cutter blade, thereby preventing such accumulation of wet grass and the like within the discharge passage inlet as might tend to clog the same and so decrease the volume and velocity of the air stream which serves to convey the cuttings to the collector.

A still further object is to provide, in a lawn care unit of the type having a rotary power lawn mower combined with a collector for the grass cuttings, means for producing a strong current of pressurized air in which the cuttings are entrained for delivery to the collector with a minimum expenditure of power.

Other objects and advantages will be apparent from the following description of the unit as constructed in accordance with the principles of the present invention, it being understood that the invention consists in the combination, construction, location and relative arrangement of parts as described, as shown in the accompanying drawings and as finally pointed out in the appended claims.

In the accompanying drawings:

FIGURE 3 is a transverse sectional view, minus the prime mover or engine, as taken along the line 3—3 of FIGURE 2;

FIGURE 4 is a vertical sectional view of the discharge passage portion of the apparatus as taken along the line 4—4 of FIGURE 2;

FIGURE 5 is a horizontal sectional view of the discharge passage portion of the apparatus as taken along the line 5—5 of FIGURE 4;

FIGURE 6 is a top plan view of the deflector portion of the discharge passage as viewed along the line 6—6 of FIGURE 4;

Figure 1:
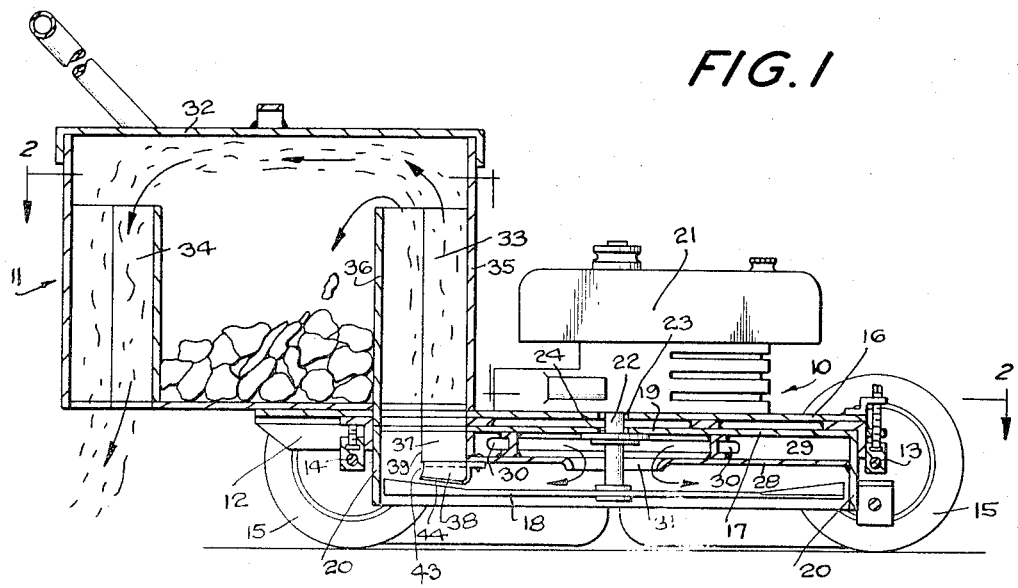
FIGURE 1 is a longitudinal sectional view of the apparatus of the present invention as taken along the line 1—1 of FIGURE 2, the prime mover or engine being, however, shown in side elevation.

FIGURES 7, 8 and 9 are transverse cross-sectional views of the deflector as taken respectively along the lines 7—7, 8—8 and 9—9 of FIGURE 6; and FIGURE 10 is a perspective view of the rotary cutter blade showing the air-impeller vanes at opposite ends of the blade.

Referring now to the drawings, it will be observed that the lawn care unit embodying the present invention generally comprises a rotary power mower 10 combined with a receptacle 11 for collecting and sorting out the grass cuttings, debris and other material discharged from the mower as it moves along the ground. The mower includes a mobile frame 12 suitably mounted upon front and rear axles 13–14 each fitted with ground-engaging wheels 15, the frame being characterized by the provision of a horizontally disposed top-plate 16 extending rearwardly from a point located approximately above the front axle to a point located somewhat beyond the rear axle so that a portion of said top plate 16 overhangs the rear axle.

Suitably secured to and carried by the top plate 16 in underslung relation thereto is an open-bottomed cylindrical housing 17 for the rotary cutter blade 18 of the mower, this housing being provided as shown with a circular top wall 19 and a depending annular flange 20 constituting the circular wall of the blade housing.

The top plate 16 serves as a mounting support for the prime mover 21, which, while shown as a gasoline-driven engine, may be an electrically-operated motor or any other suitable power unit, which prime mover is provided with a drive shaft 22 projecting vertically downward through vertically alined apertures 23 and 24 respectively formed in the top plate 16 and in the blade housing top wall 19.

Secured to the lower end of the drive shaft 22 is the cutter blade 18 rotatable in a horizontal plane just above the plane of the bottom edge of the blade housing 17. This cutter blade is preferably in the form a flat bar 25 the opposite end portions of which are provided with sharpened leading edges 26–26 for cutting through the grass and with upturned angularly disposed vanes 27–27 which serve as impellers for drawing air into and circulating it about the interior of the blade housing upon rotation of the cutter blade therewithin.

In order to increase the circulation of air within and about the interior of the blade housing for discharge therefrom by the means and for the purpose hereinafter described, the blade housing 17 is internally fitted with a plate 28 spaced vertically below the housing top wall 19 in parallel relation thereto to provide an air plenum 29 having air inlet ports 30. While these inlet openings are shown formed in the annular wall of the blade housing, they may be formed, if desired, in the top wall thereof. The air plenum plate 29 is centrally apertured, as at 31, to provide a passage around the cutter blade drive shaft 22 by way of which air from atmosphere which is initially drawn into the air plenum 29 through the inlet ports 30, is drawn centrally into the rotating blade region of the housing by the suction action of the rotating blade. The air so drawn from atmosphere into the interior of the blade housing is circulated thereabout by action of the cutter blade impeller vanes 27–27 and under the influence of the latter and the centrifugal forces generated thereby is forced out of the housing into the collector 11 for the grass cuttings and the like in the form of a pressurized current of air capable of carrying with it the cuttings and comminuted debris obtained by the cutting action of the rotating blade.

Figure 2:
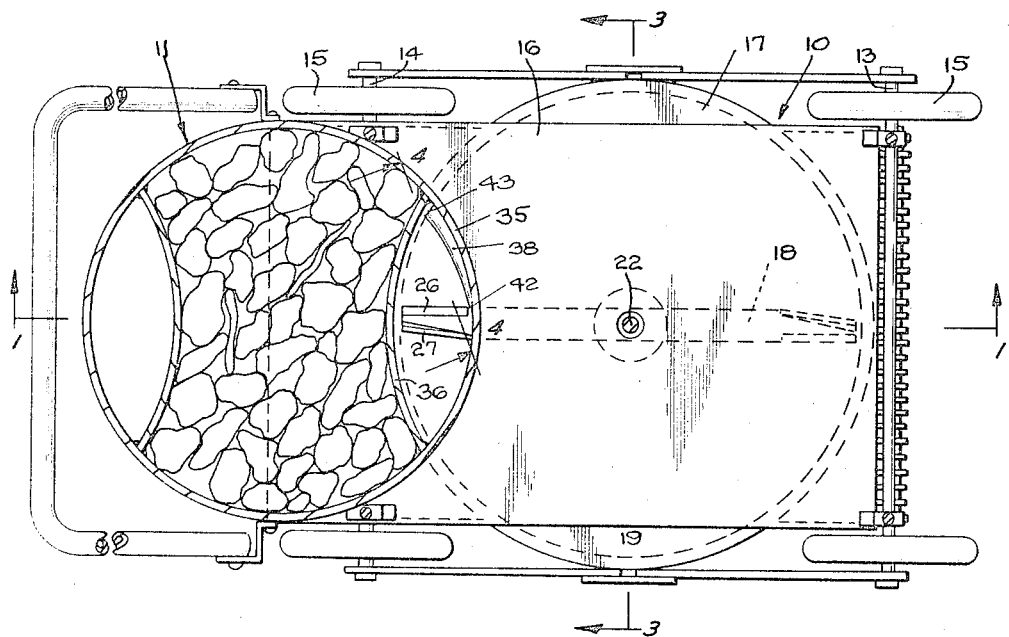
FIGURE 2 is a horizontal sectional view as taken along the line 2—2 of FIGURE 1.

The receiver 11 for collecting the heavier cuttings and debris and for winnowing out the lighter weight grass cuttings for deposit as mulch in the wake of the moving lawn care unit, is mounted, as best shown in FIGURES 1 and 2, upon the overhanging rear portion of the top plate 16 of the wheel-supported frame. This receiver is of generally cylindrical form having a removable top closure 32 and is internally provided at its forward end with a vertically extending intake passage 33 and at its rear end with a vertically extending discharge passage 34. Each of these passages is of open-ended columnar form and generally elliptical in cross-sectional shape, the upper ends of both terminating below the top of the receiver 11 for free communication therebetween as shown in FIGURE 1.

The intake passage 33 effects free communication between the interiors of the cutter blade housing 17 and the receiver 11 for delivery thereby of the cuttings to the receiver. The passage 33 is formed partially by the front cylindrical wall portion 35 of the receiver 11 and partially by an arcuately shaped partition member 36 fitted internally of the receiver in spanning relation to said frontal wall portion 35 thereof. The top plate 16 of the unit and its underlying blade housing 17 are arcuately cut out to provide an opening therethrough in registry with and of the same general contour as the passage 33, it being noted in this connection that the opposite wall portions 35 and 36 of the intake passage 33 extending upwardly from the top plate 16 are respectively coincident with the cylindrical walls of the blade housing 17 and the receiver 11.

The passage 33 extends downwardly below the horizontal plane of the motor mounting plate 16 and through the top wall of the blade housing 17. The depending flange 20, being disposed in vertical coincidence with the partition member 36, constitutes a downward continuation of said rear wall portion 36 of the intake passage 33.

The front wall portion of this passage also continues downwardly below the plane of the blade housing top wall 19 but only to a level terminating just short of the plane of rotation of the cutter blade 25.

As most clearly appears in FIGURES 1 and 4, this downward continuation of the front wall portion of the intake passage is partly effected by an arcuately curved member 37 suitably fitted in and secured to the blade housing between its top wall 19 and the plate 28 to close off and seal the air plenum 29 to entry of air except by way of the air inlet openings 30. A member 38 is secured to the air plenum plate 28 in vertical registry with the member 37. As is best shown in FIGURES 4 to 9 inclusive this member 38 is longitudinally curved in correspondence with the curvature of the vertically extending wall portion of the member 39 and of the receiver 11 so that when assembled in vertically alined relation, as shown in FIGURE 1, the member 37 and the number 38 constitute downward extensions of that portion of the cylindrical wall of the receiver which form the front wall of the intake passage 33. The opposite ends of the insert member 37 (of which one end 39 is shown in FIGURES 1 and 4) are rigidly secured, preferably as by welding, to the circular flange 20 of the blade housing, while the member 38 is preferably secured rigidly in position by providing it with a mounting flange 40 which is secured by bolts 41 or otherwise, to the undersurface of the air plenum plate 28.

The longitudinally curved member 38, as best appears in FIGURE 2, extends from a point 42 located substantially in or close to the longitudinally extending vertical median plane of the apparatus to a point spaced just short of the vertical line of juncture of the front and rear walls of the intake passage 33, to thereby provide a space or clearance 43 between the said juncture line and the proximate end of the member 38. Also, it will be noted that the member 38 is curved in vertical section, as see FIGURES 6 to 9, so that the degree of its projection inwardly of the intake passage 33 of which it forms a part progressively increases in the direction of travel of the cutting blade. The lower edge of the member 38 is horizontally turned to provide a bottom lip 44 extending along the full length thereof. The vertical depth of the member 38 progressively decreases toward its outer end so that the free edge of bottom lip 44 is disposed along a line spaced just above and paralleling the inclined upper edges of the impeller vanes which move past the member 38 during rotation of the cutter blade.

Thus, as the impeller vanes of the cutter traverse the lower open end of the intake passage 33, they act, conjointly with the member 38, to increase the pressure of the air which is directed by the rotating blade into the region (see FIGURE 5) between the rear wall portion of the intake passage 33 and the front portion thereof, which region progressively decreases in area in the direction of rotation of the cutter blade with resultant increase in pressure of the air directed into the air intake passage 33.

There is thus established a strong flow of air upwardly through the intake passage 33, which current of air emanating from the blade housing serves effectively as the medium for carrying the cuttings and debris, produced by the cutting action of the rotating blade, upwardly through the intake passage for deposite of the heavier cuttings and material in the receiver 11 and discharge of the lighter weight grass cuttings to the ground by way of the discharge passage 34.

Mention has been made of the fact that the member 38 is disposed with its forward end, considered in relation to the direction of rotation of the cutter, spaced from the adjacent wall surface of the intake passage 33. The space 43 serves importantly as a clearance passage for allowing the escape therethrough of wet grass and other material which do not pass into and up through the intake passage 33 upon a given revolution of the cutter blade, thereby preventing the accumulation of such material as might tend to eventually clog the inlet to the discharge passage. As the cutter blade continues to rotate it gathers up and delivers the material which may have passed through the escape passage and thus all of the material acted upon by the blade is eventually delivered to the receiver 11.

The close-coupled relationship between the member 38 and the impeller vanes of the rotating cuter is of great advantage not only in producing increased pressure of the air as hereinbefore described but also in insuring maximum entrainment of cuttings in the air stream for delivery thereby to the collector. The curved lip 44 of the member 38 serving as a shear plate acts in conjunction with the moving impeller vanes to shred the grass cuttings into small particle size to facilitate pick-up and delivery of the cuttings to the collector by the pressurized current of air. This shearing action is of particular importance in breaking up clogs of packed wet grass which might otherwise be too heavy to be handled by the air stream and it serves additionally to provide a self-cleaning discharge passage for the cuttings, particularly by virtue of the fact that as a given impeller vane traverses the grass shearing lip of the member 38 (as seen in FIGURE 5), they exert a squeezing action on the cut material which is being delivered by the rotating blade toward the baffle lip and so cause said material to be progressively shifted toward the outer end of the blade as it moves toward the escape passage 43, thereby constantly freeing the blade and the lip 44 of any accumulation of cuttings and so rendering them both self-cleaning in action.

It will be understood that the present invention is susceptible of various changes and modifications which may be made from time to time without departing from the general principles or essential spirit thereof, and it is accordingly intended to claim the same broadly, as well as specifically, as indicated by the appended claims.

What is claimed as new and useful is:

1. A rotary power lawn mower comprising, in combination, a cutting blade rotatably drivable in a horizontal plane, impelling means on said blade spaced radially outward from the axis of rotation and in trailing relation to the cutting edges of the cutting blade, a substantially cylindrical blade housing having a top wall and a cylindrical sidewall depending therefrom to form an open bottom, said housing diameter being slightly larger than the circle traced by the rotating blade and the depending cylindrical sidewall of said housing terminating at substantially the cutting plane of said blade, said housing top wall having a generally elliptical outlet therethrough located radially outward of the axis of rotation of the blade with its outer curved edge in substantial coincidence with housing sidewall so that the cutting blade impelling means passes directly closely beneath said outlet as the blade rotates, and a grass cutting shear plate extending downward from the curved inner edge of said outlet into said housing, said shear plate extending from one end of said outlet to a point substantially midway between the opposite ends of said curved outer edge of the outlet to provide a region immediately above the path of traverse of the blade impeller means which progressively decreases in area in the direction of rotation of the blade, said shear plate extending vertically downward into said housing to a depth sufficient to closely space its bottom edge in parallel relation to the upper edge of said impeller means to thereby provide a shearing action between said edge of the shear plate and the impeller means upon rotation of the blade relatively to said shear plate.

2. In a rotary power lawn mower as defined in claim 1 wherein the upper edges of said impeller means and the bottom edge of said shear plate respectively extend along closely adjacent parallel lines.

3. In a rotary power lawn mower as defined in claim 1 wherein the upper edges of said impeller means and the bottom edge of said shear plate are correspondingly inclined respectively along closely adjacent parallel lines.

4. In a rotary power lawn mower as defined in claim 1 wherein said shear plate is in vertical section curved outwardly toward the proximate wall portion of the blade housing.

5. In a rotary power lawn mower as defined in claim 1 wherein said shear plate is in vertical section curved outwardly toward the proximate wall portion of the blade housing and is provided along its bottom edge with a lip disposed in a plane closely spaced with respect to and paralleling the upper edge of the blade impeller means.

6. In a rotary power lawn mower as defined in claim 1 wherein the leading end of said shear plate considered in relation to the direction of rotation of the blade is spaced from the proximate wall portion of the blade housing to provide a relief passage for escape of cuttings moved toward the leading constricted end of the outlet by rotation of the blade to thereby prevent clogging said outlet by cuttings not immediately discharged therethrough during a given revolution of said blade.

7. In a rotary power lawn mower as defined in claim 1 wherein said shear plate is so angularly related to said cylindrical wall of the blade housing as to extend across the path of traverse of said impeller means on the rotating blade and thereby cause cuttings on said impeller means to be progressively shifted radially outward of the blade toward said cylindrical side wall of the blade housing as the impeller means travels past said shear plate.

8. In a rotary power lawn mower as defined in claim 1 wherein said shear plate is transversely and vertically contoured to serve as a chute for scooping up and discharging cuttings upwardly from said blade housing and out through said outlet.

References Cited
UNITED STATES PATENTS

| | | | |
|---|---|---|---|
| 2,910,818 | 11/1959 | Beal et al. | 56—25.4 |
| 2,953,888 | 9/1960 | Phillips et al. | 56—25.4 |
| 2,990,666 | 7/1961 | Blume | 56—25.4 |
| 3,188,787 | 6/1965 | Weiland | 56—25.4 |

ABRAHAM G. STONE, *Primary Examiner.*

P. A. RAZZANO, *Assistant Examiner.*